United States Patent [19]

Shamir

[11] Patent Number: 5,263,085
[45] Date of Patent: Nov. 16, 1993

[54] FAST SIGNATURE SCHEME BASED ON SEQUENTIALLY LINEARIZED EQUATIONS

[75] Inventor: Adi Shamir, Rehovot, Israel

[73] Assignee: Yeda Research & Development Co. Ltd., Rehovot, Israel

[21] Appl. No.: 974,751

[22] Filed: Nov. 13, 1992

[51] Int. Cl.$^5$ ............... H04K 1/00; H04L 9/00; H04L 9/02
[52] U.S. Cl. ...................... 380/30; 380/28; 380/44
[58] Field of Search ............... 380/28, 30, 44

[56] References Cited

U.S. PATENT DOCUMENTS

| | | | |
|---|---|---|---|
| 4,748,668 | 5/1988 | Shamir et al. | 380/30 |
| 4,932,056 | 6/1990 | Shamir | 380/30 |
| 4,987,593 | 1/1991 | Chaum | 380/30 |
| 4,995,082 | 2/1991 | Schnorr | 380/30 |
| 5,016,274 | 5/1991 | Micali et al. | 380/30 |

*Primary Examiner*—Stephen C. Buczinski
*Attorney, Agent, or Firm*—Keck, Mahin & Cate

[57] ABSTRACT

A new type of digital signature scheme whose security is based on the difficulty of solving systems of k polynomial equations in m unknowns modulo a composite n is proposed. The scheme uses a simple technique (called sequential linearization) for embedding trapdoors into such systems of equations.

14 Claims, 1 Drawing Sheet

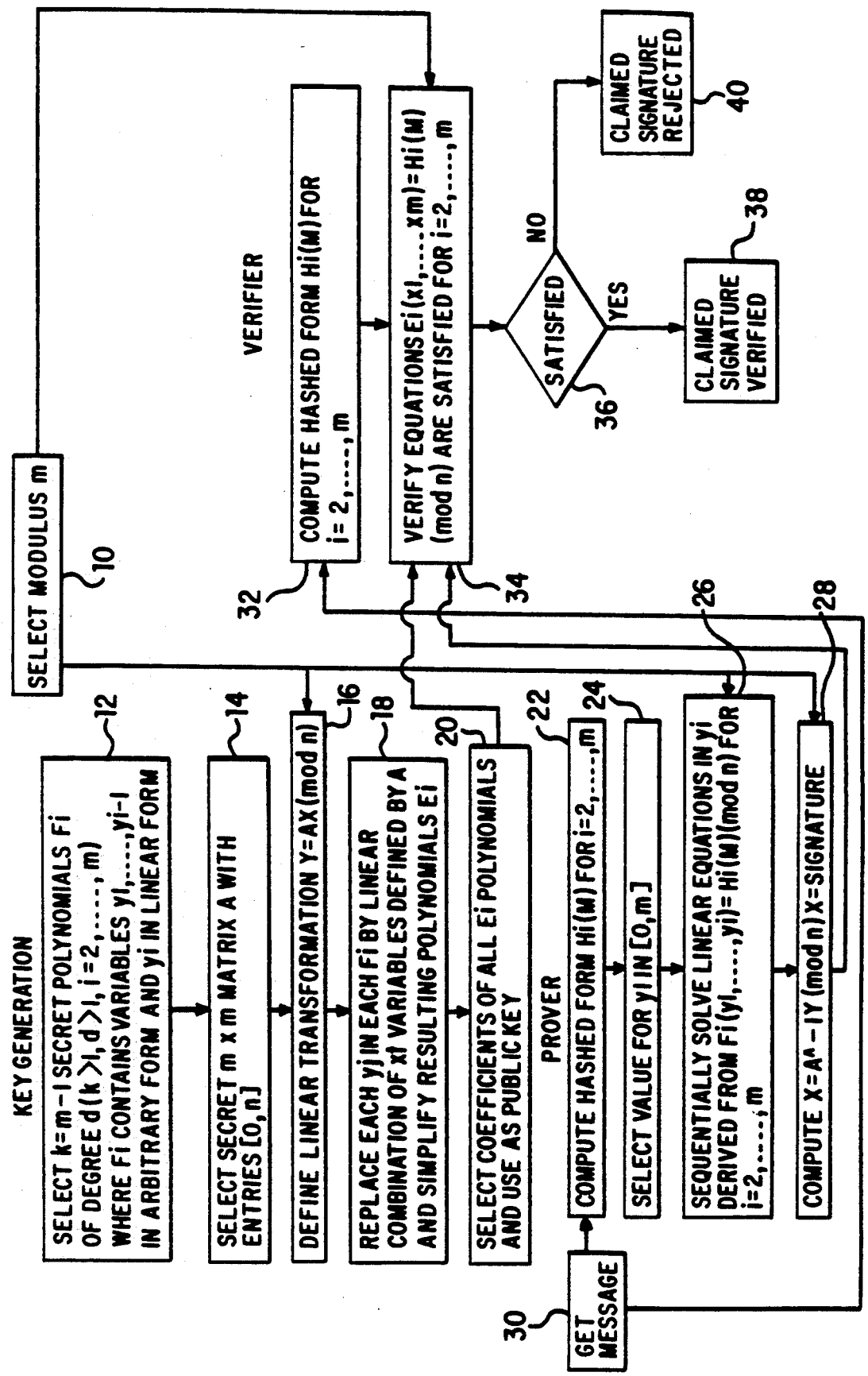

FAST SIGNATURE SCHEME BASED ON SEQUENTIALLY LINEARIZED EQUATIONS

FIELD OF INVENTION

The present invention relates to a novel method and apparatus for implementing a digital signature scheme, and more particularly relates to a method and apparatus for implementing a fast signature scheme based on sequentially linearized equations.

BACKGROUND OF THE INVENTION

A digital signature scheme is a method of ensuring the authenticity of digital messages which is unforgeable by its recipient and undeniable by its sender. It consists of two efficient (polynomial time) algorithms:

1. A generation algorithm G, which computes a signature S from a message M and from a random string R (i.e., S=G(M,R)). Since the algorithm is probabilistic, the same message can have many different signatures. The parameters of G are called the private key, and only the signer knows them.
2. A verification algorithm V, which decides whether a given S is a valid signature of a given message M (i.e., V(M,S)=yes or no). The parameters of V are called the public key, and everyone can find them in a public key directory.

The obvious condition which every digital signature scheme should satisfy is that: for any M and R, V(M,G(M,R))=yes. In addition, finding any S which satisfies V(M,S)=yes for a given M should be extremely difficult when the signer's private key is unknown. The precise formalization of this intuitive security requirement is quite subtle, and can be found e.g. in Goldwasser, Micali and Rivest[1988]: A Digital Signature Scheme Secure Against Adaptive Chosen Message Attacks. SIAM Journal of Computing, Vol. 17, No. 2, April 1988, pp. 281–308.

Almost all the practical digital signature schemes proposed so far are based on arithmetic operations modulo a large modulus n. The earliest example of such a signature scheme is the RSA scheme (Rivest, Shamir, and Adleman (1978)): A Method for Obtaining Digital Signatures and Public Key Cryptosystems, Communications of the ACM, Vol. 21, No. 2, February 1978, pp. 120–126, whose security is based on (but not known to be provably equivalent to) the difficulty of factoring the modulus n. Unfortunately, the generation of signatures in the RSA scheme requires many ($\geq 750$) modular multiplications of large ($\geq 512$ bit) numbers, and is thus quite slow. The recently introduced DSA (Digital Signature Algorithm[1991]): Specifications of a Digital Signature Algorithm, National Institute of Standards and Technology, Draft, August 1991 is based on (but not known to be equivalent to) the difficulty of computing discrete logarithms modulo large primes, and its efficiency is comparable to that of the RSA scheme. The FS scheme (Fiat and Shamir[1986]): How to Prove Yourself: Practical Solutions to Identification and Signature Problems, Proc. Crypto 86, August 1986, pp. 186–194 is considerably faster, but it still requires 30 to 60 modular multiplications. Many other variants of large-modulus schemes exist, but most of the really fast proposals (such as the OSS scheme (Ong Schnorr and Shamir [1984]): An Efficient Signature Scheme Based on Quadratic Equations, Proceedings 16th ACM Symp. Theory of Computing, May 1984, pp. 208–216, and the OS scheme (Okamoto and Shiraishi [1985]): A Fast Signature Scheme Based on Quadratic Inequalities, Proc. 1985 Symp. on Security and Privacy, April 1985 which require just a few modular multiplications to generate and verify signatures) were shown to be vulnerable to sophisticated number-theoretic attacks developed by Pollard and Brickell.

SUMMARY OF THE INVENTION

The method and apparatus of the present invention implements a novel signature scheme based on a system of multivariate polynomial equations of the form:

$$E1(x1,x2,\ldots,xm) = H1(M) \pmod{n}$$
$$E2(x1,x2,\ldots,xm) = H2(M) \pmod{n}$$
$$\vdots$$
$$Ek(x1,x2,\ldots,xm) = Hk(M) \pmod{n}$$

where M is the message to be signed, each Hi is a hash function (based on a cryptographically strong function such as DES) mapping M into a randomly-looking number in [0,n), and each Ei is a polynomial of degree $d>1$ in the m variables xj. Each user chooses a different system of $k>1$ polynomials Ei, and publishes their coefficients as his public key. The modulus n is the product of two large ($\geq 256$ bit) primes p and q. A valid signature of M is any set of values for x1, ..., xm which satisfies all the modular equations.

Solving general systems of equations of this type is considered a very difficult problem. When the number of variables and equations is allowed to increase, the problem is NP-complete even when all the polynomials Ei are quadratic (d=2) and the modulus n is a small prime (e.g., n=2). When there is one quadratic equation in one unknown (k=m=1, d=2), the problem is as hard as the factorization of the modulus. On the other hand, the problem is easily solvable if d=1, if k=1 and the factorization of the modulus is given, or if k=1 and d=2 (regardless of whether the factorization of n is given or not).

Any signature scheme should include a trapdoor which enables the legitimate signer to solve the system efficiently, but which is not visible to the cryptanalyst. One such trapdoor can be the factorization of the modulus n. The difficulty of factoring n will keep this trapdoor information invisible to the cryptanalyst, but the knowledge of the factorization will enable the legitimate signer to extract roots mod n during the equation solving process. Unfortunately, such root-based schemes are quite slow (especially in software implementations on standard microprocessors), since each root extraction requires hundreds of modular multiplications.

The novel signature scheme according to the present invention uses a different trapdoor, which requires no root extractions. According to the invention a system of polynomial equations Ei(x1,...,xm)=Hi(M) (mod n) is changed by a linear transformation Y=AX (mod n) (where X is the vector of m original xj variables, Y is a vector of m new variables yj, and A is some invertible m×m matrix) into a system of polynomial equations of the form Fi(y1,...,yi) in which yi occurs only linearly. Due to the triangular form of the resultant equations (in which the i-th equation contains only the first i variables), the user can sequentially solve them by substituting the already computed values of y1,...,yi-1 into Fi, and solving the resultant equation Fi=Hi(M) (mod n)

which is linear in the single remaining variable yi. The computed Y solution can be translated back into the desired X solution via the inverse linear transformation $X = A^{-1}Y \pmod{n}$.

The actual key generation process is carried out in reverse order: The user first chooses the triangular polynomials Fi(y1, . . . ,yi) and the matrix A, and then transforms each Fi into Ei by replacing each yj variable with the linear combination of xj variables indicated by the A transformation.

In the preferred embodiment of the scheme, each Fi is a second degree polynomial of the form:

Li(y1, . . .,yi−1)*yi + Qi(y1, . . .,yi−1)

where Li is a randomly chosen linear form and Qi is a randomly chosen quadratic form in the stated variables. The linear transformation $Y = AX \pmod{n}$ translates such an expression into a homogeneous quadratic polynomial which is the sum of $m(m+1)/2$ monomials of the form cij*xi*xj.

The first equation is a special case, since L1 and Q1 do not have any arguments. Instead of publishing the resultant linear equation (which can help the cryptanalyst), the user drops the first equation during the key generation process, and assigns an arbitrary value to y1 during the message signing process. The remaining system of $k = m-1$ quadratic equations in the m variables xj will have about n solutions (i.e., signatures) for each message M, depending on the actual choice of value for y1.

The general form of a homogeneous quadratic F2 is c1*y1*y2 + c2*y1*y1, which can be rewritten as y1*(c1*y1 + c2*y2). The parenthesized linear expression can be considered as the new definition of y2 under a modified definition of the matrix A. Thus, one can assume without any loss of generality that in the case of homogeneous quadratic equations F2 has the simple form y1*y2.

To further complicate the task of the cryptanalyst, the user can optionally apply a secret k×k linear transformation B to the k polynomials Ei (i.e., to their vectors of coefficients) in order to mix them and to hide their structure. This preserves the easy solvability of the modified system of equations E'i(x1, . . .,xm) = Hi(M) (mod n). Other and further objects and advantages of the present invention will be evident from the following detailed description taken in conjunction with the drawing.

DESCRIPTION OF THE DRAWING

The sole figure of the drawing is a schematic showing the novel method and apparatus for generating and verifying a signature to a message.

DETAILED DESCRIPTION OF A PREFERRED EMBODIMENT

Referring now to the drawing, the basic structure of the method and apparatus of the present invention implementing the novel fast signature scheme based on sequentially linearized equations will now be described in detail. The description will be by reference to the various steps of the novel method, however, the apparatus employed to effect the various steps, will be evident as a means to carry out the prescribed function and known data processing equipment for these purposes will be readily apparent to those of ordinary skill in this art from the following elaboration of the invention.

The first part involves the generation of a public key. The first step is to select a public composite modulus n, and destroy its factorization as noted in block 10. Next, the user selects $k = m-1$ secret polynomials Fi of degree d ($k > 1$, $d > 1$, $i = 2, \ldots, m$) where Fi contains the $i-1$ variables y1, . . . ,yi−1 in an arbitrary form and the variable yi in a linear form as shown in block 12. The user then selects a secret m×m matrix A with entries in [0,n), block 14 and defines the linear transformation $Y = AX \pmod{n}$, block 16. The user now replaces each yj in each Fi by the linear combination of xt variables defined by A, and simplifies the resultant polynomials Ei, block 18. Finally, the user extracts the coefficients of all the Ei polynomials and defines (publishes) them as the public key, block 20.

Signature generation is carried out in the following manner. Given the message M, block 30, the user computes its hashed forms Hi (M) for $i = 2, \ldots, m$, block 22. The user chooses a value for y1 in [0,n), block 24 and sequentially solves the linear equations in yi derived from Fi(y1, . . . ,yi) = Hi(M) (mod n) for $i = 2, \ldots, m$, block 26. The user, then computes $X = A^{-1}Y \pmod{n}$, and sends X as the signature of M, block 28.

Signature verification is carried out in the following manner. The message M, block 30, is transferred to block 32 where its hashed forms Hi(M) for $i = 2, \ldots m$ are computed. The signature X is transferred from block 28 and the public key is transferred from block 20 to block 34 where, the equations Ei(x1, . . . xm) = Hi (M) (mod n) are verified as satisfied for $i = 2, \ldots, m$ in decision 36. If YES, the signature is accepted in block 38; if NO, the signature is rejected in block 40.

There are many possible generalizations and extensions of this scheme which now should be obvious to anyone skilled in the art. For example, the user can assign arbitrary values to several yi variables, can determine the values of several yj variables by solving subsystems of simultaneous linearized equations, can choose rational rather than polynomial expressions, can use a universal modulus n chosen by a trusted center, etc.

The following represents one of the simplest implementations of the present invention. As a single quadratic equation in two variables has been shown by Pollard to be solvable in polynomial time even when the factorization of the modulus is unknown, the simplest recommended implementation of the present invention is two quadratic equations in three variables. Their general form is:

F2(y1, y2) = y1*y2

F3(y1,y2,y3) = (c1*y1 + c2*y2)*y3 + (c3*y1*y1 + c4*y1*y2 + c5*y2*y2)

where c1, . . . ,c5 are random secret constants according to the teachings of the present invention. It may be desirable to use a larger minimum implementation, e.g. three quadratic equations in four unknowns, and in fact it may be desirable to use a larger minimum implementation, such as three quadratic equations in four unknowns.

To solve the equations Fi = Hi (M) (mod n), the user chooses y1, computes y2 from the first equation by a single modular division, and computes y3 from the second equation by seven modular multiplications and one modular division. The 3×3 matrix $A^{-1}$ can be assumed without loss of generality to contain a first column of 1's, and thus only six additional multiplications are required to transform the Y solution into an X solution. The total number of modular multiplications/divisions required to generate a signature is thus 15, and the size of the transmitted signature is $3 \times 512 = 1536$ bits.

The user's public key consists of the $2 \times 6 = 12$ coefficients of E2 and E3. This number can be reduced to 8 by applying an appropriate $2 \times 2$ transformation B to the two polynomials Ei which changes two of their coefficients to 0 and two of their coefficients to 1 before they are published. A further optimization can reduce the number of coefficients which should actually be retained by each verifier to 4: Instead of verifying separately the two modular equations, the verifier can choose a random linear combination of the two equations with small (say, 64 bit) coefficients, retain only the resultant linear combinations of coefficients, and check each signature X by substituting it into the combined equation. If the signer does not know which random combination of the two equations the verifier will actually check, then any attempt to send an X which does not satisfy one of the equations will succeed only with negligible ($\leq 2^{-64}$) probability. As an additional benefit, the number of modular multiplications required to verify the signature is reduced to 7 (if one ignores the cheap multiplications of full size numbers by 64 bit coefficients). The implementation outlined above can be demonstrated with the (totally insecure) modulus $n = 7*11 = 77$. Except for the smallness of the coefficients, this is a typical example of the key generation process with 3 variables and 2 quadratic equations.

The secret polynomials F2 and F3 are chosen as:

$F2(y1,y2) = y1*y2$ $F3(y1,y2,y3) = (4*y1+3*y2)*y3+(9*y1*y1+21*y1*y2+4*y2*y2)$

The secret linear transformation A is chosen as:

$y1 = x1+x2+3*x3$ $y2 = x1+2*x2+x3$ $y3 = x1+x2+4*x3$

By substituting these linear expressions into the Fi's and simplifying, the two quadratic expressions result:

$E2(x1,x2,x3) = 1*x1*x1+3*x1*x2+4*x1*x3+2*x2*x2+7*x2*x3+3*x3*x3 \pmod{77}$ $E3(x1,x2,x3) = 41*x1*x1+37*x1*x2+35*x1*x3+0*x2*x2+41*x2*x3+54*x3*x3 \pmod{77}$ The public key is the pair of vectors of coefficients:

$K2 = (1, 3, 4, 2, 7, 3)$ $K3 = (41, 37, 35, 0, 41, 54).$

However, before publishing these two vectors, the user can apply any invertible $2 \times 2$ matrix B to these vectors, either in order to mix their coefficients for security reasons, or in order to eliminate some of the coefficients for efficiency reasons. After receiving the two vectors, the verifier can decide to retain only one secret linear combination such as:

$K1 = 3*K2+2*K3 = (8, 6, 5, 6, 26, 40) \pmod{77}.$

This halves the size of the public key directory that the verifier has to store, but still enables him to check with high confidence the validity of the given signature (x1, x2, x3) by checking that the evaluation of the polynomial defined by the vector of coefficients K1 is equal to $3*H2(M)+2*H3(M) \pmod{77}$.

There now follows a small modulus variant of the novel scheme. As stated, the security of the scheme is based on the difficulty of factoring the modulus n, and in fact there are fast techniques (based on Grobner bases) for solving small systems of multivariate polynomial equations when this factorization is known. However, the general problem of solving large systems of quadratic equations is NP-complete even for a small prime modulus such as $n=2$. This can provide an alternative basis for the security of the new signature scheme, which is unrelated to the difficulty of factoring large integers.

In the small modulus variant of the new signature scheme, the modulus n is chosen as a small number (preferably smaller than $2^{32}$; a good choice can be $n=251$ which is the largest single byte prime). The actual construction of the public and private keys is the same, except for the following additional precautions:

1. Since F2 is easy to factor modulo the small modulus, it is essential to either drop additional equations, or to mix the published polynomials with a randomly chosen matrix B.
2. The number of variables m should be increased to at least 16, and possibly to 32, in order to foil the known equation solving techniques.
3. If the modulus n is too small, the cryptanalyst can try to exhaustively search for a solution. The number $n^m$ of possible assignments of values to variables should be at least $2^{64}$, and preferably over $2^{128}$.

The main disadvantage of the small modulus variant of the scheme is the large size of the public key. A general homogeneous quadratic expression in 16 variables has 136 coefficients, and 15 such equations have 2040 coefficients. Even if each coefficient fits into a single byte, the total size of each public key is about 16 kilobits, which makes this variant unattractive.

Known components can be used for the apparatus of the present invention as portrayed in the sole FIGURE, the means to carry out the several steps of the process being apparent to those skilled in the art.

Although the invention has been shown and described in terms of a specific preferred embodiment and variants, changes and modifications are possible which do not depart from the spirit, scope or contemplation of the inventive concepts disclosed herein. Such are deemed to fall within the purview of the invention as claimed.

What is claimed:

1. A method of generating and verifying digital signatures comprising the steps of:
   a) selecting a modulus n,
   b) selecting $k = m-1$ secret polynomials Fi of degree d ($k>1$, $d>1$, $i=2\ldots,m$) where Fi contains variables $y1\ldots yi-1$ in arbitrary form and yi in linear form,
   c) selecting a secret $m \times m$ matrix A with entries in $[0,n)$,
   d) defining a linear transformation $Y = AX \pmod{n}$, e) replacing each yi in each Fi by the linear combination of xt variables defined by A and simplifying the resulting polynomials Ei, f) selecting the coefficients of all the Ei polynomials and using them as a public key, g) generating a message M, h) computing the hashed form Hi(M) for $i=2\ldots,m$, i) selecting a value for y1 in [0,n), j) sequentially solving the linear equations in yi derived from Fi (y1 ... yi)=Hi(M)(mod n) for $i=2\ldots,m$, k) computing $X=A^{-1}Y$ (mod n) to derive a signature X of message M, l) transmitting to a verifier the modulus n of step a, the public key of step f, the message M of step q and the signature X of step k, m) verifying the signature X of the message M by computing the hashed form Hi(M) for $i=2,\ldots,m$, and verifying that equations Ei(x1, ... ,xm)=Hi (M) (mod n) are satisfied for $i=2,\ldots,m$.

2. The method of claim 1, including the further step of assigning arbitrary values to several yi variables.

3. The method of claim 1, including the further step of determining the values of several yj variables by solving subsystems of simultaneous linearized equations.

4. The method of claim 1, wherein the modulus n of step a is selected by a trusted center.

5. The method of claim 1, including the further step of applying an invertible $k \times k$ matrix B to the coefficients of step f.

6. The method of claim 1, including the further step of combining the coefficients of step f, during verification, by a secret linear combination.

7. The method of claim 1, wherein the modulus n is selected as a small number in the range $(2,2^{32}]$.

8. Apparatus for generating and verifying digital signatures comprising:

a) means for selecting a modulus n, b) means for selecting $k=m-1$ secret polynomials Fi of degree d($k>1$; $d>1$, $i=2,\ldots,m$) where Fi contains variables y1, ... ,yi−1 in arbitrary form and yi in linear form, c) means for selecting a secret $m \times m$ matrix A with entries in [0,n), d) means for defining a linear transformation $Y=AX$ (mod n)

e) means for replacing each yj in each Fi by linear combination of xt variables defined by A and simplifying the resulting polynomials Ei, f) means for selecting coefficients of all the Ei polynomials and using them as a public key, g) means for generating a message M, h) means for computing the hashed form Hi(M) for $i=2,\ldots,m$, i) means for selecting a value for y1 in [0,n), j) means for sequentially solving the linear equations in yi derived from Fi(y1,...,yi)=Hi (M) (mod n) for $i=2,\ldots,m$, k) means for computing $X=A^{-1}Y$ (mod n) to derive a signature X of the entity to prove its identity, l) means for transmitting to a verifier the modulus n of step a, the public key of step f, the message M of step q and the signature X of step k, m) means for verifying the signature X of the message M by computing the hashed form Hi (M) for $i=2,\ldots,m$, and verifying that equations Ei(x1, ... ,xm)=Hi(M)(mod/n) are satisfied for $i=2,\ldots,m$.

9. Apparatus according to claim 8, wherein arbitrary values are assigned to several yi variables.

10. Apparatus according to claim 8, wherein means are provided for determining the values of several yj variables by solving subsystems of simultaneous linearized equations.

11. Apparatus according to claim 8, wherein the modulus n is provided by a trusted center.

12. Apparatus according to claim 8, wherein means are provided for applying an invertible $k \times k$ matrix B to the coefficients.

13. Apparatus according to claim 8, wherein means are provided to combine the coefficients during verification, by a secret linear combination.

14. Apparatus according to claim 8, wherein the modulus n is a small number in the range $[2,2^{32}]$.

* * * * *